April 27, 1954

R. RUPERT 2,676,518

REFLECTING DEVICE

Filed July 5, 1951

INVENTOR.
Richard Rupert.
BY
Frishburn & Mullendore
ATTORNEYS.

April 27, 1954

R. RUPERT 2,676,518

REFLECTING DEVICE

Filed July 5, 1951

INVENTOR.
Richard Rupert
BY
Fishburn & Mullendore
ATTORNEYS.

Patented Apr. 27, 1954

2,676,518

UNITED STATES PATENT OFFICE 2,676,518

REFLECTING DEVICE

Richard Rupert, Independence, Mo.

Application July 5, 1951, Serial No. 235,256

1 Claim. (Cl. 88—78)

This invention relates to reflecting devices and more particularly to reflectors which are constructed to reflect light impinging thereon from a distant source back to the general direction of the light source, irrespective, within limits, of the angle of incidence of the impinging light.

Reflecting devices having a series of reflecting units arranged in contiguous relation with each of the units having reflecting surfaces arranged relatively at approximate right angles and in a circuit about the axis thereof have long been used as signals on automobiles and at points of danger to reflect the beam of an automobile headlight to apprise drivers that they are approaching a danger point or other location. The reflecting units of such devices have three reflecting surfaces arranged to intersect at a common point with the reflecting surfaces at right angles to each other such as, in effect, the corner of a cube whereby the beam impinging on such a surface is reflected from surface to surface about the axis and back along the instant beam. The reflecting units preferably are prismatic and have highly polished surfaces in proper angular relation to form substantially optically true, congruent trihedral angles. It is also common practice for such reflector devices to have spherical front surfaces.

In reflecting devices of such character, the units have different ranges of inclination with respect to the axis of the unit. Due to this characteristic the angular range or field is greater on one side of the axis of the unit than on the other. Under some conditions this restricts the utility of the device. In some such devices the reflecting units have been arranged in areas on opposite sides of a bisecting division line with corresponding surfaces of the units in each area lying in parallel planes whereby the units in one area have opposed orientations to the units in the other area, the corresponding reflecting surfaces of the units in each area which are parallel to the division line therebetween facing generally away from said division line. Such an arrangement gives substantially the same range of inclination on both sides of a division line, but there is a loss of reflecting ability in the line of division or juncture of the areas and the entire reflecting device is not of uniform efficiency when viewed at different angles relative to the direction of the division line, making it important to position the division line substantially perpendicular to the plane in which light beams are usually directed on the device.

The objects of the present invention are to provide a reflecting device in which these disadvantageous features are substantially overcome; to provide a reflecting device in which the prismatic formations are joined for maximum reflecting efficiency and whose range of inclination will be substantially the same in any direction from the axis of the entire reflector; to provide a reflector device having a plurality of areas of reflecting units wherein the corresponding faces of the units in each area are in parallel planes with one set of such surfaces located at acute angles to corresponding surfaces of the units in adjacent areas and diametrically opposed areas, the reflecting surfaces of the units in each area which are parallel to the division line between the adjacent areas facing generally toward said division line; to provide a reflecting device having reflecting units with surfaces intersecting to form merging hexagonal apertures with the central or axial aperture relative to the entire device having six surfaces, the apertures along the division lines having four surfaces and the apertures in the areas between division lines having three surfaces, the latter reflecting surfaces being substantially square; and to provide a reflecting device having spaced areas whose range of inclination will be substantially the same on one side of the axis of the entire reflector as the range of inclination of the intermediate areas on the other side thereof.

In accomplishing these and other objects of the present invention, I have provided improved details of structure, the preferred forms of which are illustrated in the accompanying drawings, wherein.

Figure 1:
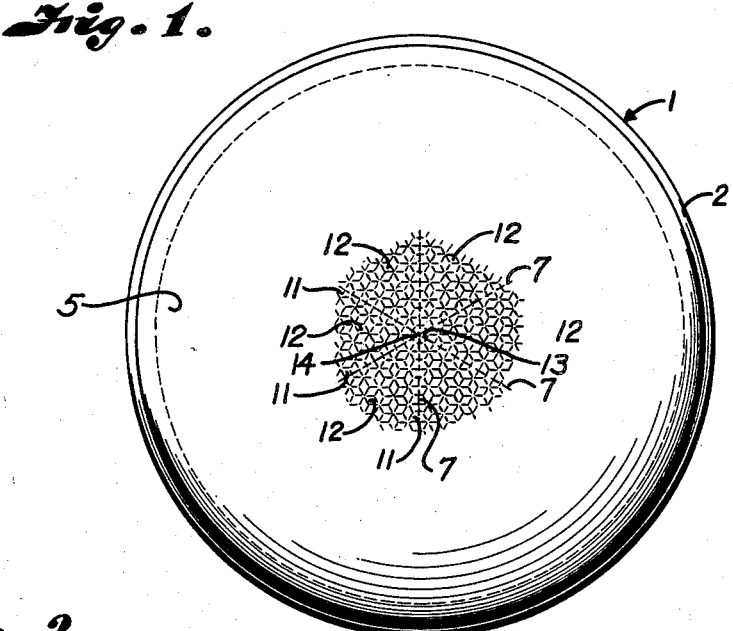
Fig. 1 is a face view of a reflecting device embodying this invention.

Referring more in detail to the drawings:

I designates a reflecting device illustrated in the form of a circular disk, although it will be understood that the device may be of any other suitable formation. The reflecting device may be provided with a rim 2 so as to fit a suitable holder (not shown) for mounting the device on a vehicle or other desired location. The reflector in this particular embodiment has a rear face of prismatic formation 3 in the form of a pressed or molded article made of glass or artificial resin. The reflecting device has on the back thereof a series of reflecting units 4 of the triple reflector type, arranged in contiguous relation. The front face 5 of the reflector may be plane, convex, or concave, and the reflecting units conform generally to the contour of the front face with the axes of the reflecting units parallel. Generally the reflector units are each of the character in which a series of reflecting surfaces is arranged relatively at approximate right angles and in a circuit around the reflector unit axis so that light impinging thereon from a distant source will be successively reflected by the surfaces about the axis and back in the general direction of the light source. The units are arranged in adjacent groups, said units being arranged in contiguous relation with the surfaces of a unit intersecting with surfaces of the surrounding units so as to form an hexagonal aperture therefor.

In the construction of a molded reflecting device the prismatic formation 3 is a duplicate in reverse of the mold, and in whatever manner the mold is formed the reflector will correspond. It is preferable that each surface of the reflector units be approximately optically flat and highly polished, and that the line of intersection between adjacent surfaces throughout the entire prismatic formation be very sharp whereby substantially the entire prismatic area is a plurality of reflecting surfaces with substantially no loss of reflecting ability due to lines of intersection. The prismatic formation of the reflecting device is preferably divided into a plurality of adjacent areas 6 by radial lines 7. In the illustrated structure, the division lines are six in number, forming six equal circular sector areas or groups of reflecting units. The prismatic structure is such that it is defined by a plurality of contiguous hexagonal areas 8 with the central hexagonal area 9 positioned whereby the division lines 7 extend from the axis thereof perpendicular to the sides 10 of the area 9. A line of hexagonal areas 11 extends along each of the division lines 7 in such a manner that the division lines extend through the axis of the hexagonal areas and perpendicular to opposite sides thereof which are parallel to the respective sides 10 of the hexagonal area 9. A plurality of hexagonal areas 12 is arranged in the field of each area 6, between the lines of hexagonal areas 11.

The hexagonal area 9 is preferably provided with six surfaces 13, each sloping inwardly toward the axis 14 and toward the front face 5 of the reflecting device. The hexagonal areas 11 along each of the division lines 7 are preferably provided with four surfaces 15, each of which generally slopes toward the front surface 5 of the reflecting device and toward the axis 16 of the respective hexagonal area. The hexagonal areas 12 are preferably provided with three surfaces 17, each of which slopes toward the front face and toward the axis of the respective hexagonal area. All of the surfaces 17 are arranged whereby they are at right angles to each of the adjacent surfaces to form a substantially optically true, congruent trihedral angle, each of the surfaces 17 also being substantially square. The faces 15 are arranged at right angles to adjacent surfaces 15 on the same side of a division line 7 and are also at right angles to adjacent surfaces 17. The surfaces 13 are at right angles to adjacent surfaces 15, which are between the same division lines 7.

Figure 2:
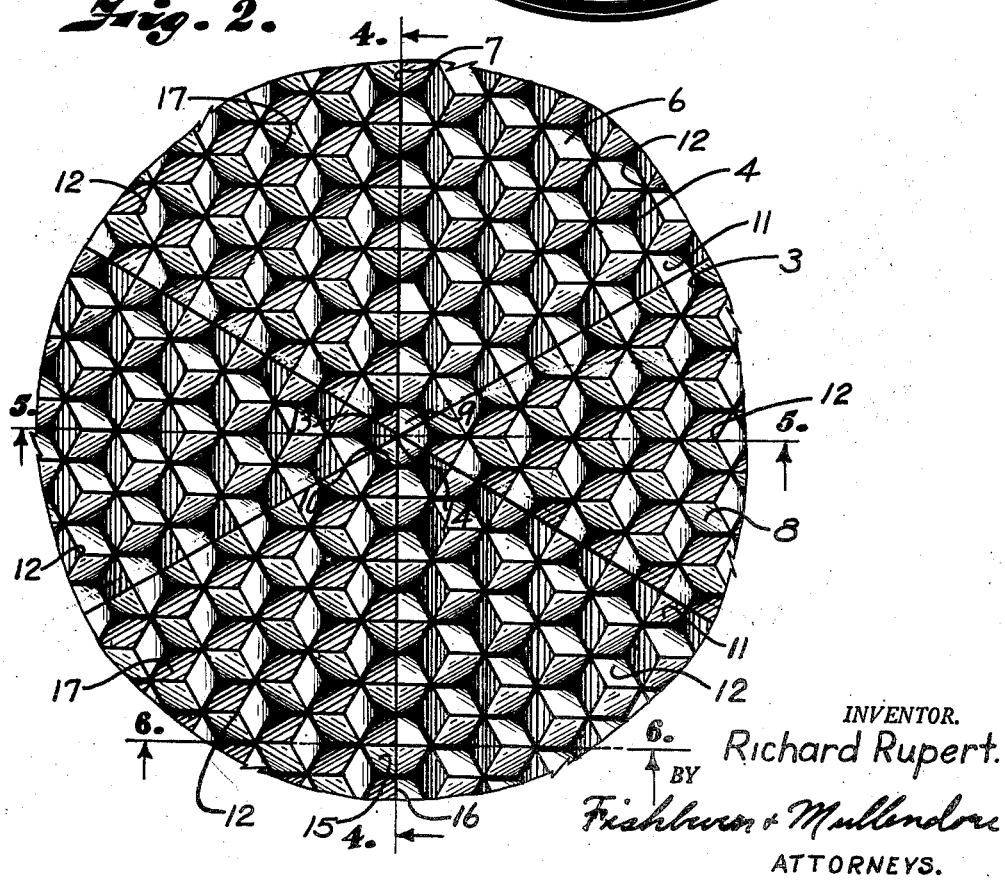
Fig. 2 is a large detail rear view of a portion of the reflecting device.
Figure 3:
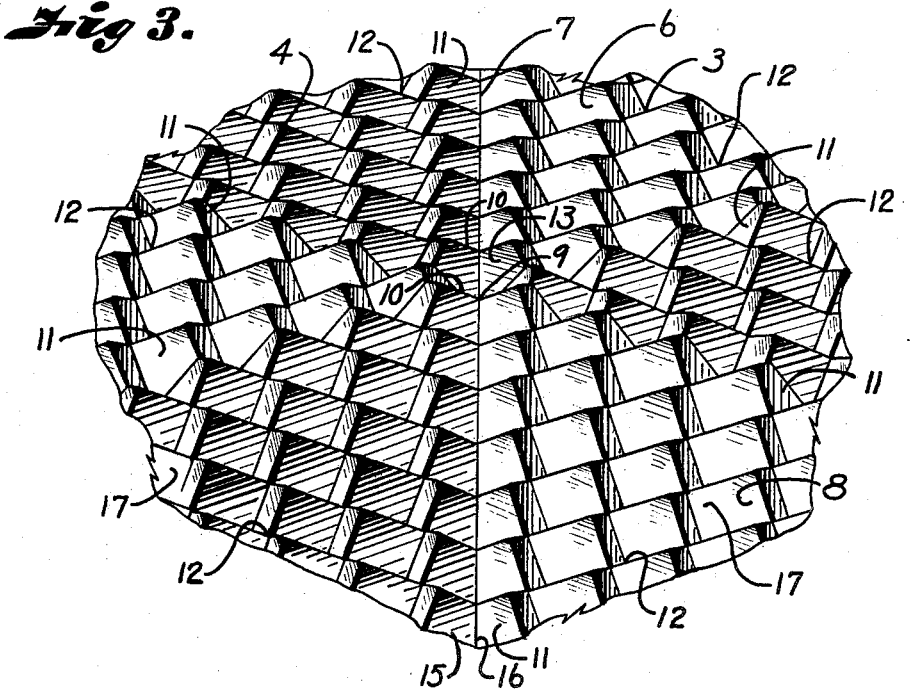
Fig. 3 is an enlarged perspective view of a group of reflecting units from the rear of the reflecting device.
Figure 4:
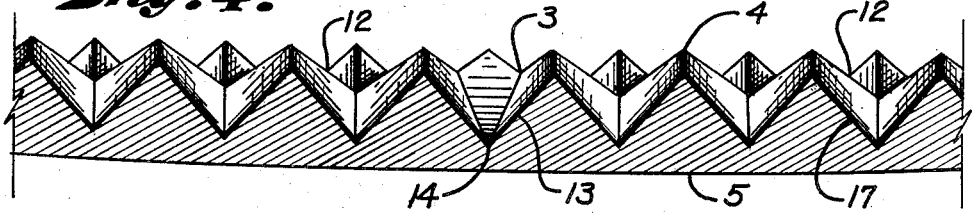
Fig. 4 is an enlarged transverse sectional view through a portion of the reflecting device on the line 4—4, Fig. 2.
Figure 5:
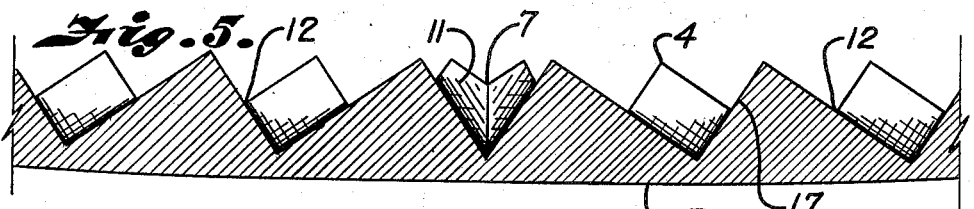
Fig. 5 is an enlarged sectional view through a portion of the reflecting device on the line 5—5, Fig. 2.
Figure 6:
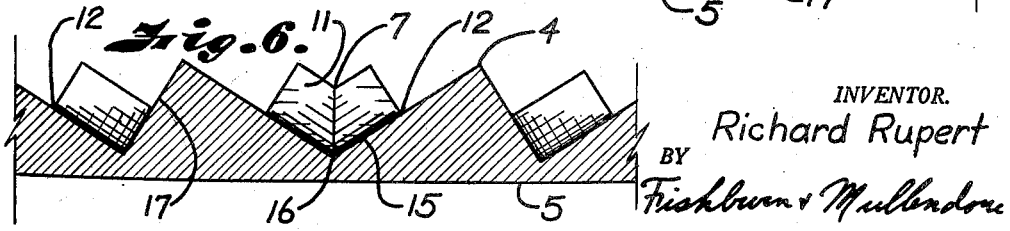
Fig. 6 is an enlarged sectional view through a portion of the reflecting device on the line 6—6, Fig. 2.

With this arrangement, the reflecting units 4 have a plurality of reflecting surfaces arranged relatively at right angles and in a circuit around its axis, and all of said units are arranged with their axes parallel. The reflecting units 4 in each group 6 are arranged in parallel rows with the corresponding surfaces in each area lying in parallel planes. The maximum range of inclination of all units lies away from the adjacent division line 7, with the minimum inclination on the other side of the axis and toward the division line 7. The reflecting units in any one group 6 have the same orientation and also the reflecting units in alternate groups have the same orientation. The reflecting units in diametrically opposite groups have opposed orientations. This is accomplished in the manner shown in Fig. 2. The reflecting device which has the reflecting units formed thereon is divided to provide a plurality of reflector unit groups or areas defined by the division line 7. The units of each group or area are arranged in contiguous relation with the corresponding surfaces lying in parallel planes with one set of corresponding surfaces parallel to one division line and another set of corresponding surfaces parallel to the other division line defining the respective area or group 6. The third set of corresponding faces in the respective group is parallel to a diametrical division line passing through the axis of the entire reflecting device at an angle of 60° relative to both of the division lines defining the respective group. With this arrangement the maximum range of inclination of the reflecting units in each of the groups 6 lies generally toward the axis of the entire reflector. Also the surfaces of the reflecting units in one group, which are in planes parallel to a division line, are located at acute angles to corresponding surfaces of reflecting units in an adjacent area. These surfaces in the adjacent areas, which are in planes parallel to a division line therebetween, may be said to face in opposite directions or away from the division line. However, in actual use as a reflector, the beam of light is directed toward the front face 5 into the reflector and is successively reflected by the surfaces of the reflecting units back through the reflector in the general direction of the light source. Therefore, in operation, the reflecting surfaces should be said to generally face the front face 5 and the surfaces of the reflecting units in adjacent areas which are in planes parallel to a division line therebetween are at acute angles and face toward said division line.

It is to be noted that there is no spacing between the reflecting units adjacent any division line. On the contrary, there is a merging of the oppositely inclined reflecting units whereby there is substantially complete reflection of the light impinging thereon. Also the range of inclination of the reflecting units is such that the angular range of field from which the reflector will be visible is the same on either side thereof. However, when light is directed from adjacent one side of said angular range or field, it will be reflected back in the general direction of the light source from alternate areas or groups 6, and when the light is directed on the reflector from adjacent the other side of the angular range or field the light reflected back toward the source will be from the other alternate areas or groups.

It is believed obvious that I have provided a reflecting device whose range of inclination will be substantially the same in any direction from the axis of the entire reflector and that it will provide optimum reflection. It is obvious that various changes may be made in details without departing from the spirit of this invention and it is therefore to be understood that this invention is not limited to the specific details shown and described.

What I claim and desire to secure by Letters Patent is:

A reflecting device of the character described comprising, a plate having a front face and a rear face, a plurality of radial division lines in said rear face and extending outwardly from the center thereof to define a plurality of adjacent reflector areas on said rear face arranged in a circuit about a reflector axis extending through the center of the reflector and perpendicular to the rear face thereof whereby the reflector areas are in multiples of opposed circular sectors, each reflector area being composed of a series of contiguous successive rows of reflecting units in each reflector area, said reflecting units being prismatic and having a series of reflecting surfaces arranged relatively at right angles and forming congruent trihedral angles with the apex of each of said prismatic reflecting units the rearmost point thereof, all of said reflecting units being arranged whereby respective axes extending through the apices thereof are parallel, the reflecting units of each area being arranged in contiguous relation with the surfaces of the several reflecting units intersecting so as to form merging hexagonal apertures therefor, a row of hexagonal areas lying along each division line between adjacent reflector areas, said hexagonal areas that lie along each division line having four reflecting surfaces therein, and other hexagonal areas of like size in the respective reflector areas defined by the division lines having three square reflecting surfaces, the reflecting units in each reflector area having surfaces lying in parallel planes with one set of such surfaces in planes parallel to one division line defining the respective reflector areas and another set of such surfaces in planes parallel to the other division line defining the respective reflector area, the reflecting units of areas on opposite sides of a division line having opposed orientation and having surfaces in planes parallel to said division line, the surfaces of the reflecting units of one area which lie in planes parallel to one of the division lines defining same being located at acute angles to the surfaces of reflecting units of the adjacent reflector area on the opposite side of said division line which lie in planes parallel to said division lines, said acute angles diverging toward the front face of the plate.

References Cited in the file of this patent

UNITED STATES PATENTS

| Number | Name | Date |
|---|---|---|
| 1,754,899 | Miller | Apr. 15, 1930 |
| 2,205,638 | Stimson | June 25, 1940 |